United States Patent [19]

Trudeau, deceased

[11] 4,359,304

[45] Nov. 16, 1982

[54] BOARD SEPARATOR

[75] Inventor: Marcel R. Trudeau, deceased, late of Eugene, Oreg., by Claire Trudeau, administratrix

[73] Assignee: Seneca Sawmill Company, Inc., Eugene, Oreg.

[21] Appl. No.: 135,475

[22] Filed: Mar. 31, 1980

[51] Int. Cl.³ .............................................. B65G 59/08
[52] U.S. Cl. ..................................... 414/37; 414/109; 414/330; 414/117; 198/489
[58] Field of Search ....................... 198/489, 406, 443; 414/37, 330, 103, 109, 117, 907; 209/517; 144/245 R; 271/221, 222

[56] References Cited

U.S. PATENT DOCUMENTS 3,374,904  3/1968  Francois .......................... 414/907 X
4,179,236 12/1979  Jones .................................... 414/117

*Primary Examiner*—Allen N. Knowles
*Attorney, Agent, or Firm*—Klarquist, Sparkman, Campbell, Leigh, Whinston & Dellett

[57] ABSTRACT

A board separator apparatus includes an input conveyor for longitudinally feeding groups of vertically positioned boards into a transfer box which is pivoted to transfer the boards downwardly into board receiving mechanism including an elevator. The transfer box is provided with parallel walls which are relatively movable in accordance with the number and size of boards in a group. The board receiving mechanism comprises an extension of the parallel walls of the transfer box in their unloaded position, said board receiving mechanism having separator arms against which the side of a group of boards is received, and a gate extending downwardly in parallel juxtaposition to the separator arms, initially substantially closing off the board receiving mechanism. The gate further comprises a plurality of piston operated stops mounted for movement toward the separator arms for urging boards of a group into alignment. The separator arms are then rotated outwardly causing the individual boards of a group to pass one at a time over an edge and down a ramp onto an output conveyor for horizontally transporting the boards.

14 Claims, 2 Drawing Figures

BOARD SEPARATOR

BACKGROUND OF THE INVENTION

The present invention relates generally to board separator apparatus for separating individual boards from groups of boards, and particularly to an improved board separator apparatus adapted to receive and separate varying sizes and numbers of boards in said groups. The boards may be cants which are sawn from a round log so they have rounded edge portions or wanes on one side of the board. Moreover, the size of the boards, for example the width dimension, as well as the number of boards in a group depend not only on the size of the log but also on how far out toward the periphery of a log a particular group of boards has been cut. Thus, the size and number of boards in a group can be subject to wide variation.

In the application of Aaron U. Jones entitled "Board Separator", Ser. No. 886,879, filed Mar. 15, 1978, now U.S. Pat. No. 4,179,266, a board separator apparatus is disclosed and claimed including a transfer box receiving a group of boards from a conveyor and operable to move said group of boards into board receiving means or separator means where the group can be moved laterally by separator arms for dropping the boards successively off the surface of an elevator member. A foreshortened pressure plate, actuated by gravity or a dash-pot type mechanism, is employed to urge the group of boards against the separator arms.

Unfortunately, both the transfer box and the board receiving or separating means have to be wide enough to receive the maximum possible thickness of a group of boards which may arrive on the input conveyor. A smaller group of boards or ones having smaller dimensions may not be properly aligned and correctly separated despite the presence of the aforementioned pressure plate suitable for a larger size and number of boards. Thus, small width boards or cants may fall into the board receiving means with a wrong angular orientation or may become jammed, and may even drop past the aforementioned pressure plate and onto the outfeed conveyor with the wrong side up. In such case, the machine may have to be stopped, or at least incorrenctly separated boards may have to be manually removed or turned for continued operation of the apparatus.

Rapid emptying of boards from the transfer box has been found to be desirable so that the transfer box may quickly return to its load position and receive a second group of boards following the first group on the input conveyor. Dropping the boards into an awaiting board receiving means rather than transferring the same downwardly on an elevator for substantially the same downward distance can enhance speed of operation, but tends to aggravate the aforementioned problem associated with alignment of the boards against the separator arms.

SUMMARY OF THE INVENTION

In accordance with the present invention in one embodiment thereof, board separating apparatus comprises a transfer box having a lower opening, said box being movable in a horizontal direction for urging a group of boards off a conveyor. Board receiving means below the transfer box includes a lower discontinuous surface for supporting the edges of the boards and separator arms against which the side of a group of boards is received. Means are provided for urging said group of boards against said separator arms and energizing means are employed for imparting positive motion thereto for aligning the boards of substantially any group of boards prior to separation. The separator arms then move the group of boards in a lateral direction across the discontinuous surface, and one by one off said surface, such that the boards successively drop away from the remainder of the boards of a group.

In accordance with a preferred embodiment, the transfer box comprises a pair of substantially parallel walls, at least one of said walls being movable with respect to the other for receiving a variable number and size of boards. A group of boards can be thereby supplied to the board receiving means with more nearly correct orientation prior to final alignment.

In accordance with another advantageous construction, the means for urging said group of boards against the separator arms comprises a gate member extending downwardly in parallel juxtaposition with the separator arms and initially substantially closing off the board receiving means. This gate member further comprises a plurality of piston operated stops mounted for movement toward the separator arms for urging boards of a group into alignment. As a result, the board separator can receive differing combinations of boards and can satisfactorily separate boards even if relatively narrow in width or cut near the periphery of a log without causing downtime of the apparatus.

In accordance with another advantageous construction, the group of boards is dropped from the transfer box onto the awaiting surface of the board receiving means by a distance exceeding the major part of the width of the group of boards. Therefore, additional downward movement, if any, required to clear the transfer box is minimized and the transfer box can be rapidly returned to a position for receiving a next group of boards from the input conveyor.

It is accordingly an object of the present invention to provide an improved board separator apparatus adaptable to compensate for varying board shapes, sizes and numbers.

It is another object of the present invention to provide an improved board separator apparatus which is controllable in accordance with the boards to be received thereby.

It is another object of the present invention to provide an improved board separator apparatus operable on a substantially continuous basis without requiring manual intervention for dealing with small boards or cants.

It is another object of the present invention to provide an improved board separator apparatus which is economical in construction while exhibiting improved operating speed and reliability.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side elevational view of an embodiment of the board separator apparatus according to the present invention; and FIG. 2 is a partial front elevation view of the apparatus of FIG. 1, with parts broken away for clarity.

DETAILED DESCRIPTION

Figure 1:
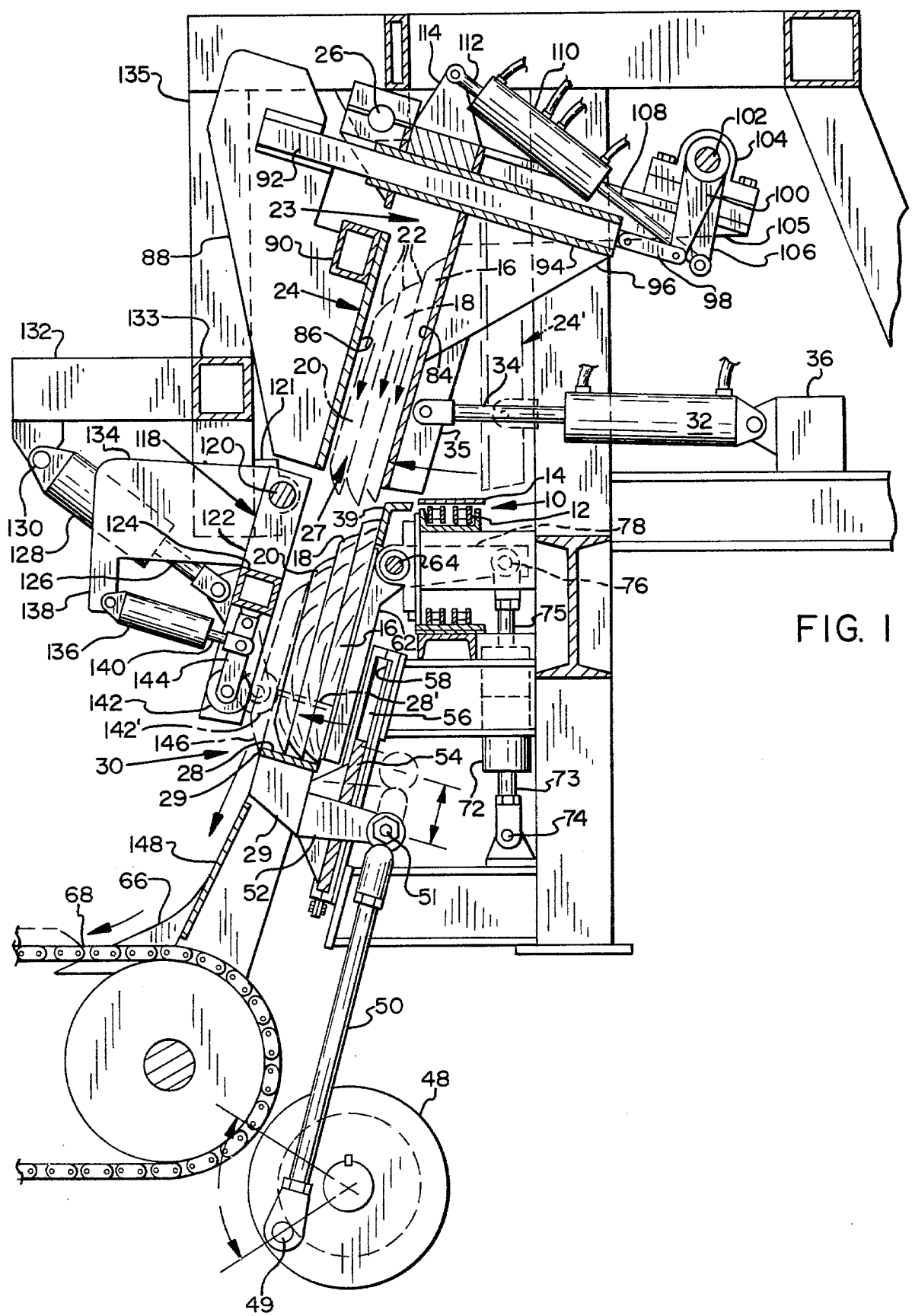
Figure 2:
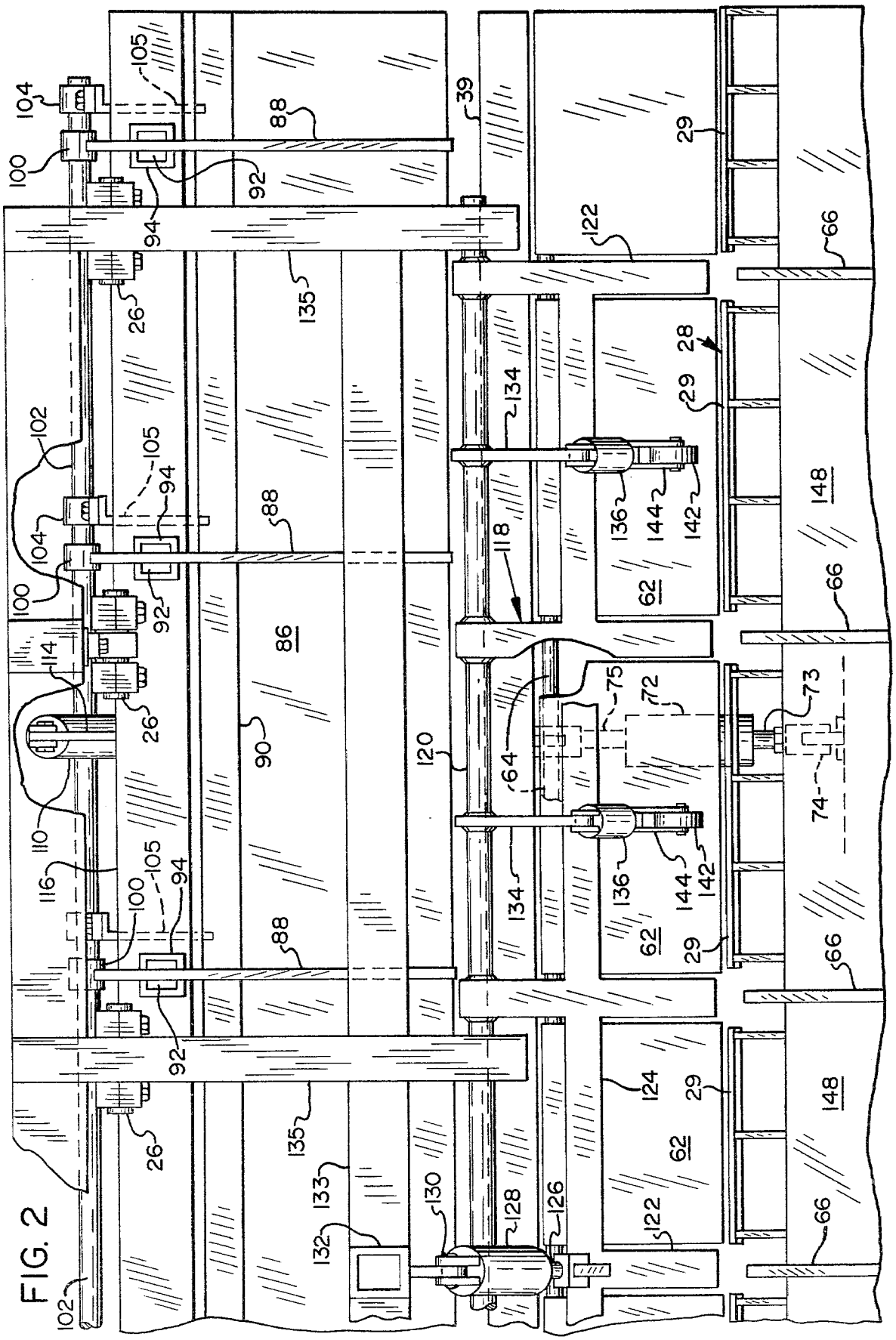

As shown in FIGS. 1 and 2, a preferred embodiment of the board separator apparatus of the present invention includes an input conveyor 10 which may consist of an endless conveyor chain 12 having members 14 attached at spaced positions on the chain. Groups of boards are transported in a substantially vertical position on such input conveyor with the board edges resting on the conveyor. Channel members (not shown) are employed on opposite sides of the upper reach of the input conveyor 10 in order to support the groups of boards in a substantially vertical position until the boards enter transfer box 24. Each group of boards may consist, for example, of three boards or "cants" 16, 18 and 20 which are cut from a round log and so have rounded edges or wanes 22 at their opposite edges. The boards will have been simultaneously cut from a larger cant prior to transport on conveyor 10, and will exhibit wanes facing the same direction.

Each group of boards is transmitted by the input conveyor 10 into the open end 23 of transfer box 24. The transfer box is pivotally mounted on shafts 26 at the upper or header end of such box for pivotal movement between a vertical load position 24' shown in phantom lines above the input conveyor, and an angular unload position 24 shown in solid lines wherein the box makes an angle of approximately seventeen degrees with the vertical. The transfer box has a bottom opening 27 so the boards slide out of the transfer box and down into board receiving means 30 having a lower discontinuous surface for supporting the boards on edge. This discontinuous surface in the present embodiment consists of the top of an elevator 28 defining a forward edge 29 over which the boards are urged, one at a time, as hereinafter more fully described.

The transfer box 24 is pivoted between the load position and unload position. For this purpose, rear brace 35 of the transfer box is pivotally connected to the rod 34 of a pneumatic cylinder 32, the latter being pivotally secured to support 36. The hydraulic cylinder is alternately operated to move piston rod 34 in and out causing the transfer box 24 to pivot about shafts 26 between the load position 24' and the unload position 24. As a result, groups of boards are transferred from the input conveyor 10 to the top of the elevator 28 in the board receiving means 30. The top of the elevator 28 in its raised position illustrated at 28' is still spaced well below the top of conveyor 10 and the bottom of the transfer box whereby a group of boards drop onto the elevator as they are moved in the clockwise direction by the transfer box, and do not drag across the elevator. Also, the drop substantially clears the transfer box in the case of smaller width boards, or only requires a small additional downward movement of the elevator in the case of greater width boards. In any case, the boards drop by a distance exceeding the major part (more than half) of the board width. The elevator rapidly moves downwardly about seven inches between the position at 28' and the position at 28, as the boards are received, whereby the fall of the boards is broken. The transfer box which has swung rapidly from position 24' to the position indicated at 24 to discharge a group of boards, is then immediately returned to position 24' whereby the same can receive another group of boards following on conveyor 10. The speed of operation of the transfer box is reduced to a matter of seconds.

The elevator is moved from the position indicated at 28' to the position indicated at 28 by a rotating crank 48 connected at pivot 49 to one end of a coupling rod 50, whose other end is connected at pivot 51 to a projection 52 extending from the side of the elevator 28. The projection 52 is secured to a guide plate portion 54 of the elevator which slides along an inclined track 56. Thus, the guide member 54 slides up and down in track channel 56 to guide the movement of the elevator along the inclined path between the raised position 28' and the lowered position indicated at 28. A bearing surface of low friction material 58 may be provided on the lower surface of the inclined track, i.e. to the right in FIG. 1. The crank 48, which is duplicated at each end of the apparatus, may be coupled to an electrical motor or hydraulic cylinder (not shown) for intermittent rotation of the crank through approximately 60 degrees for raising and lowering the elevator 28 in synchronism with the pivotal movement of the transfer box 24. As a result, the elevator executes downward movement starting as pneumatic cylinder 32 moves the transfer box to the unload position whereby the boards will drop onto the rapidly downwardly moving elevator which is arranged to have a speed corresponding to a substantial proportion of the velocity of the boards due to gravity.

The transfer box includes a rear wall 84 and a forward wall 86 disposed in parallel facing relation to one another, wherein the distance therebetween is controllable in accordance with the variable number and size of boards to be received via conveyor 10. The forward wall 86 is carried by a plurality of substantially vertically oriented plates 88 and is braced by a horizontal beam 90. Plates 88 are secured to the ends of square rods 92 slidably received through square channels 94 lined with nylon inserts. The square channels are secured to transfer box header 116 while also passing through rear transfer box wall 84 where braces 96 join the channels to the transfer box rear wall. The remote end of each rod 92 is pivotally connected via a flexible link 98 to an arm 100 secured upon a shaft 102 which rotates in bearings 104 and extends longitudinally of the apparatus. Also secured to shaft 102 is an arm 106 having a pivotal connection with rod 108 of double air cylinder 110, the latter being further provided with a second rod 112 pivotally engaging an ear 114 mounted upon transfer box header 116. Double air cylinder 110 is comprised of two cylinder compartments and is able to provide three different degrees of elongation between the respective piston rods for turning shaft 102 to three different angular positions. The shaft 102, through arms 100, slides the rods 92 inwardly and outwardly and thereby selectably positions the forward wall 86 of the transfer box 24. The three positions of forward wall 86 in the specific embodiment were two inches, five inches and seven inches from wall 84. The two-inch position was suitable for receiving one or two boards, the five-inch position for three boards, and the seven-inch position for heavier boards. Thus the adjustable positioning of forward wall 86 relative to rear wall 84 of the transfer box facilitates the reception of differing numbers and thicknesses of boards in a group, and this positioning is controlled by an operator who controls the saws (not shown) from which the group of boards is delivered to conveyor 10. The proper positioning of the transfer box walls insures the individual boards will be substantially upright as received in the transfer box, and the boards will be inclined against one another as illustrated in the drawing when the transfer box is rotated to its clockwise or unload position as indicated at 24.

The board receiving means 30 further includes a plurality of separator means comprising separator arms 62 which are mounted on a pivot shaft means 64 and are spaced longitudinally along such pivot shaft just below entrance plate 39. The separator arms engage the inner board 16 of each group of boards as the boards slide into the board receiving means 30 from the transfer box. The separator arms 62 are normally angularly oriented in alignment with wall 84 of the transfer box 24 when the latter is in its unload position. The board receiving means further includes a gate 118 comprised of a plurality of downwardly extending beam members 122 mounted for rotation with a cross shaft 120, and a common horizontal beam member 124 extending between and joining the members 122 approximately midway therealong. Shaft 120 is mounted between bearings 121 secured to downwardly extending frame members 135. The gate 118 is disposed in substantially parallel relation to entrance plate 39 and separator arms 62, and is further controllable in position by means of air cylinder 128 having its piston rod 126 centrally joined pivotally to the gate 118 and its opposite end 130 pivotally supported from a frame member 132 extending outwardly from a frame cross member 133 located between uprights 135. Gate 118 and separator arms 62 together with entrance plate 39 form sides of channel-like board receiving means providing an extension of the transfer box in its unload position assuming the walls 84 and 86 are most widely separated. As a consequence, the group of boards, when urged off the conveyor by the transfer box, drop or slide in an angular direction into the board receiving means until they reach elevator 28. The gate 118 closes the forward side of the channel, being substantially juxtaposed with separator arms 62, and keeps the forwardmost boards from falling over or toppling out, should they, for example, not be properly aligned or should they become incorrectly oriented as they drop from the transfer box. As appears, the gate 118 extends nearly to the top of elevator 28 in its lowermost position, rather than being foreshortened. Furthermore, the gate is moved upwardly and outwardly (in a clockwise direction) by air cylinder 128 when the separator arms 62 urge boards off the elevator as hereinafter more fully described.

In addition, to insure the correct placement of the boards against separator arms 62, a plurality of piston operated stops are provided in the form of wheels 142, formed of elastomeric material, mounted at the lower ends of arm 144, each said arm having a pivotal connection with gate crossbeam 124. Air cylinders 136 have their piston rods pivotally connected to arms 144 while the remote ends of the cylinders are pivotally carried by downwardly extending portions 138 of vertical plates 134 secured for rotation with shaft 120 and the gate member. Thus, the piston operated stops are normally aligned with and normally rotate with gate 118 but are actuated relative thereto by means of air cylinders 136. After a group of boards slides downwardly from the transfer box 24 into the board receiving means 30 between separator arms 62 and gate 118, the stops 142 are simultaneously actuated, employing air cylinders 136, to urge an incorrectly oriented board or boards against the remainder of the boards in the group, and the group against separator arms 62, to insure their parallel and closely packed relation and alignment for subsequent separation. Thus, should boards have become misoriented in falling from the transfer box, as for example by pitching forward in a counterclockwise direction in the case of a narrow board, the gate 118 insures their containment within the board receiving means, and the piston operated stops 142 are energized for imparting positive motion to the stops and the boards contacted thereby for moving the group of boards back into closely packed alignment. In FIG. 1, the actuated position of a piston operated stop is illustrated at 142' wherein the stop is urged against an outermost board 20 for positively urging board 20 and the boards thereabeneath against separator arms 62.

The separator arms are pivoted outwardly, i.e. in a clockwise direction, about the axis of shaft 64, from the rest position as shown into successive discharge positions for consecutively moving the lower edges of boards 20, 18 and 16 across the forward edge 29 of the elevator whereby these boards succesively slide down retaining wall 148 upon ribs 66 onto the upper reach of substantially horizontal output conveyor 68. Since the boards are oriented in an angular manner against separator arms 62 and continue to be so oriented as they slide down ribs 66, they will be successively transferred onto conveyor 68 in a predictable horizontal position. The board wanes will face the left in FIG. 1 as a result of the sawing procedure, and consequently the wanes will be oriented upwardly on conveyor 68 for subsequent detection and removal. In FIG. 1, a board 146 is illustrated in dashed lines at the edge of the elevator about to slide downwardly onto conveyor 68. The separator arms 62 are pivoted by a pair of double-ended air cylinders 72 having their lower piston rod 73 fixed to the frame by pivot connection 74 and having their upper piston rod 75 pivotally connected at 76 to a link 78 which is welded to the pivot shaft 64 of the separator arms. The air cylinders 72 are two stroke cylinders and together they deliver three strokes of approximately three-fourths inch length each to move a separator arm 62 into three successive angular positions spaced in a clockwise manner from the position shown at 62 by a sufficient distance to urge the successive boards boards 20, 18 and 16 past elevator forward edge 29. The actuating cylinders 72 are suitably controlled by an electronic computer (not shown) which also controls the intermittent operation of the transfer box 24, elevator 28, and the gate and stops. Thus, the elevator is moving downwardly as the transfer box drops a group of boards into the board receiving means 30, and when the elevator reaches its downwardmost position, piston operated stops 142 are energized for compacting the boards against separator arms 62. Then, the gate 118 is moved in a clockwise direction by air cylinder 128 while air cylinders 72 successively move the group of boards so that each one in succession is forced off edge 29 of the elevator and onto the off-bearing conveyor 68.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. Board separating apparatus comprising:

means for receiving a group of boards on edge, said means including separator means against which the side of said group of boards is received in upstanding relation, said separator means comprising means for moving said group of boards in a lateral direction across a discontinuous supporting surface, and one by one off said surface, such that said boards successively drop away from the remainder of the boards of said group, means for urging said group of boards against said separator means, including energizing means for imparting positive motion to said urging means in a direction toward said separator means for mutually aligning the boards of said group prior to separation, said urging means being upraised after aligning said boards leaving said boards free on their forward side to be moved off said discontinuous surface, and a horizontal conveyor for receiving said boards wherein said boards are angularly disposed in passing from said discontinuous surface and fall onto said conveyor with a horizontal orientation.

2. Board separating apparatus comprising:

an input conveyor for conveying boards in groups, each group including a plurality of boards on edge, a transfer box having a lower opening and being movable in a horizontal direction for urging said group of boards off the conveyor, means below said transfer box for receiving the groups of boards from the lower opening of the transfer box, the last mentioned means having a lower discontinuous surface for supporting the edges of the boards and separator means against which the side of a group of boards is received, said separator means comprising rearward means for moving said group of boards in a lateral direction across said discontinuous surface, and one by one off said surface, such that said boards successively drop away from the remainder of the boards of a group, said separator means having an angular orientation, and forward gate means for initially substantially closing off said means for receiving boards, wherein said gate means opens on the forward side of said means for receiving boards as said rearward means moves boards off said discontinuous surface, said gate means comprising means for urging said group of boards against said separator means, including energizing means for imparting positive motion to said urging means in a direction toward said separator means for mutually aligning the boards of said group prior to separation, and a horizontal off-bearing conveyor for receiving said boards in succession, said boards retaining an angular orientation as they leave said discontinuous surface to fall onto said conveyor in a horizontal position.

3. The apparatus according to claim 2 wherein said means for urging said group of boards against said separator means comprises a plurality of air piston operated stops mounted for movement toward said separator means for urging said boards together and aligning the same for proper separation.

4. The apparatus according to claim 2 wherein said transfer box is pivotable relative to said input conveyor.

5. The apparatus according to claim 2 including an elevator providing said lower discontinuous surface, and means for rapidly moving said elevator in a downward direction as a group of boards is received from said transfer box.

6. The apparatus according to claim 2 wherein said separator means comprises arms pivotally mounted proximate their top ends and including cylinder means for pivoting said arms from a rest position through a plurality of discharge positions corresponding to the number of boards in a group.

7. Board separating apparatus comprising:

an input conveyor for conveying boards in groups, each group including a plurality of boards on edge, a transfer box having a lower opening and being movable in a horizontal direction for urging said group of boards off a conveyor, means below said transfer box for receiving the group of boards from the lower opening of the transfer box, the last mentioned means having a lower discontinuous surface for supporting the edges of the boards and separator means against which the side of a group of boards is received, said discontinuous surface being spaced below said transfer box by a distance exceeding the major part of the width of the boards of said group when receiving said boards such that the boards drop by a distance exceeding at least the major part of the board widths, said separator means comprising means for moving said group of boards in a lateral direction across said discontinuous surface, and one by one off said surface, such that said boards successively drop away from the remainder of the boards of a group, and a horizontal off-bearing conveyor for receiving said boards in succession.

8. The apparatus according to claim 7 including an elevator providing said lower discontinuous surface, and means for rapidly moving said elevator in a downward direction as a group of boards is received from said transfer box, said elevator clearing said boards from said transfer box, and means for immediately returning said transfer box to a position for receiving boards from said conveyor.

9. Board separating apparatus comprising:

an input conveyor for conveying boards in groups, each group including a plurality of boards on edge, a transfer box having a lower opening and being movable in a horizontal direction for urging said group of boards off the conveyor, said transfer box comprising a pair of substantially parallel walls, one of said walls being movable with respect to the other for receiving a variable number and size of said boards, and including means for moving said movable wall in parallel relation to the remaining wall in accordance with the number and size of boards to be received, means below said transfer box for receiving the groups of boards from the lower opening of the transfer box, the last mentioned means having a lower discontinuous surface for supporting the edges of the boards and separator means against which the side of a group of boards is received, said separator means comprising means for moving said group of boards in a lateral direction across said discontinuous surface, and one by one off said surface, such that said boards successively drop away from the remainder of the boards of a group, said separator means having an angular orientation, means for urging said group of boards against said separator means, including energizing means for imparting positive motion to said urging means in a direction toward said separator means for mutually aligning the boards of said group prior to separation, and a horizontal off-bearing conveyor for receiving said boards in succession, said boards retaining an angular orientation as they leave said discontinuous surface to fall onto said conveyor in a horizontal position.

10. The apparatus according to claim 9 wherein said means for moving said movable wall comprises a plurality of rods extending from one of said walls in the direction of the remaining wall, a plurality of channels secured to one of said walls and receiving said rods, and means for providing relative movement between said rods and said channels.

11. Board separating apparatus comprising:

an input conveyor for conveying boards in groups, each group including a plurality of boards on edge, a transfer box having a lower opening and being movable in a horizontal direction for urging said group of boards off the conveyor, said transfer box comprising a pair of substantially parallel walls, one of said walls being movable with respect to the other for receiving a variable number and size of said boards, and including means for moving said movable wall in accordance with the number and size of boards to be received, wherein said means for moving said movable wall comprises a plurality of rods joined to said movable wall and extending in the direction of the remaining wall, a plurality of channels secured to said remaining wall and receiving said rods, and means for sliding said rods relative to said channels for moving said movable wall toward and away from the remaining wall, means below said transfer box for receiving the groups of boards from the lower opening of the transfer box, the last mentioned means having a lower discontinuous surface for supporting the edges of the boards and separator means against which the side of a group of boards is received, said separator means comprising means for moving said group of boards in a lateral direction across said discontinuous surface, and one by one off said surface, such that said boards successively drop away from the remainder of the boards of a group, said separator means having an angular orientation, means for urging said group of boards against said separator means, including energizing means for imparting positive motion to said urging means in a direction toward said separator means for mutually aligning the boards of said group prior to separation, and a horizontal off-bearing conveyor for receiving said boards in succession, said boards retaining an angular orientation as they leave said discontinuous surface to fall onto said conveyor in a horizontal position.

12. Board separating apparatus comprising:

an input conveyor for conveying boards in groups, each group including a plurality of boards on edge, a transfer box having a lower opening and being movable in a horizontal direction for urging said group of boards off the conveyor, means below said transfer box for receiving the group of boards from the lower opening of the transfer box, the last mentioned means having a lower discontinuous surface for supporting the edges of the boards and separator means against which the side of a group of boards is received, said separator means comprising means for moving said group of boards in a lateral direction across said discontinuous surface, and one by one off said surface, such that said boards successively drop away from the remainder of the boards of a group, said separator means having an angular orientation and comprising a pivotable separator arm, means for urging said group of boards against said separator means including energizing means for imparting positive motion to said urging means in a direction toward said separator means for mutually aligning the boards of said group prior to separation, said urging means comprising a pivotable gate movable in substantially parallel relation to said separator arm and a plurality of piston operated stops mounted relative to said gate for movement toward said separator arm for urging said boards together and aligning the same for proper separation, and a horizontal off-bearing conveyor for receiving said boards in succession, said boards retaining an angular orientation as they leave said discontinuous surface to fall onto said conveyor in a horizontal position.

13. The apparatus according to claim 12 wherein said piston operated stops comprise a plurality of wheels formed of elastomeric material and respectively mounted on arms extending downwardly from part of said pivotable gate, said stops in their non-operated position being aligned with said gate, and said stops being rotatable forwardly of said gate to urge said boards together.

14. The apparatus according to claim 12 wherein said gate extends downwardly toward said discontinuous surface, normally substantially closing off said board receiving means, and means for pivoting said gate forwardly out of the way after operation of said piston operated stops to provide an opening for passage of said boards across said discontinuous surface by said separator means.

* * * * *

UNITED STATES PATENT AND TRADEMARK OFFICE
CERTIFICATE OF CORRECTION

PATENT NO. : 4,359,304
DATED : November 16, 1982
INVENTOR(S) : MARCEL R. TRUDEAU It is certified that error appears in the above—identified patent and that said Letters Patent is hereby corrected as shown below:

Column 1, line 20, "U.S. Patent No. 4,179,266" should have been --U.S. Patent No. 4,179,236--.

Signed and Sealed this

Fifth Day of July 1983

[SEAL]

Attest:

GERALD J. MOSSINGHOFF

Attesting Officer

Commissioner of Patents and Trademarks